Jan. 18, 1955  E. H. BALZ  2,700,010
ACID TREATMENT OF GLASS FABRIC, PRIOR TO LAMINATION
Filed July 5, 1951  3 Sheets-Sheet 1

INVENTOR
EMIL H. BALZ
BY
ATTORNEYS

Jan. 18, 1955  E. H. BALZ  2,700,010
ACID TREATMENT OF GLASS FABRIC, PRIOR TO LAMINATION
Filed July 5, 1951  3 Sheets-Sheet 3

INVENTOR
EMIL H. BALZ
BY
ATTORNEYS

United States Patent Office 2,700,010
Patented Jan. 18, 1955

2,700,010

ACID TREATMENT OF GLASS FABRIC, PRIOR TO LAMINATION

Emil H. Balz, Waterville, Ohio, assignor to Glass Fibers Inc., Toledo, Ohio, a corporation of Ohio Application July 5, 1951, Serial No. 235,161

6 Claims. (Cl. 154—128)

This invention relates to glass fabric and the treatment thereof to render the same suitable for the formation of laminates with other materials. More particularly the invention relates to methods of preparing glass fabric for lamination with resin compositions.

In my co-pending applications, Serial No. 228,623, filed May 28, 1951, now Patent No. 2,674,548, and Serial No. 228,624, filed May 28, 1951, now Patent No. 2,674,549, I have set forth methods of cleansing glass fabric surfaces of binder material to prepare the glass fabric for subsequent lamination with resins.

In the first of these co-pending applications I have described a method of removing a binder material from glass fabric in which the glass fabric and binder are treated with a strong alkali solution and then passed through a heated oven, whereafter the cloth may be treated with a bleaching agent to completely cleanse the fabric of any binder which may remain thereon after the alkali and heat treatments.

In the second co-pending application I have described a method of removing binder material from glass fabric by treating the fabric containing the binder with a strong oxidizing agent, which is then passed through a heated oven and then in given instances passed through a bleaching agent solution to secure a completely cleansed glass fabric. In this latter application I have also described an embodiment in which the bleaching treatment is not required, complete removal of binder being effected by adjustment of the heating cycle.

These methods of treating glass fabric, as noted in the co-pending applications, are suitable to cleanse the cloth and prepare it for lamination and are particularly effective when alkali is used in the process, since the glass surface is hydrolyzed thereby, that is, the glass surface attains a hydroxyl group.

The clean surfaces thus procured are suitable for lamination directly with resinous materials such as the silicones and are particularly suitable after further treatment with a cationic agent such as a chrome complex application (a methacrylatochromic chloride), for lamination with polyesters. Treatment of the cleaned glass with a silane prior to application of the silicone resins is also very beneficial.

I have now discovered that if the cleansed glass cloth having a hydrolyzed surface is first subjected to a preliminary acid treatment prior to a chrome complex or silane application that the water resistance of the ultimate laminate is materially improved.

I have also discovered that if, in the oxidizing treatment for the removal of the binder, the cloth is subjected to the treatment of a strong alkali solution prior to the preliminary acid treatment, that a material improvement in the strength of the laminate, particularly as to water resistance, is attained. It has thus appeared after extensive experiment that the treatment of the glass with a strong alkali is, for reasons not completely understood, effective to increase the strength and particularly the water resistance of the ultimate bond between a resin and a glass when the cleaned glass is first given a preliminary acid treatment prior to lamination. It also appears that while the effect of the alkaline bleaching agent utilized in the oxidizing and cleansing process is of assistance in the procuring of improved bonds it is not as effective as a strong alkali. Accordingly a strong alkali may supplement the action of the bleaching agent and may also be effectively employed under conditions where, as noted in the second of my co-pending applications, the treatment with a bleaching agent is not necessitated, that is where complete removal of the binder from the glass is effected by the oxidizing agent and combustion alone.

It is believed that the acid of the preliminary treatments acts upon the silicate complex comprising the glass mass and converts groups such as O—Alk to O—H. This is borne out by the fact that it has been consistently found that a cleaned glass cloth which has been retained in contact with acids under limiting conditions, demonstrates a particular activity toward other substances having a hydroxyl grouping such as resins requiring condensation of the OH as, for example, the phenols. Evidently the presence of a large number of O-Alk groups which are promoted by the strong alkali results in a correspondingly greater number of O—H groupings, resulting in improved attractive power of the treated glass for these resin materials. The acid treatment therefore is considered to be enhanced in effectiveness by the presence of a large number of O—Alk groups on the cloth, and the alkaline treatments referred to hereinbefore are effective to increase the number of such groups which may be normally present on the fabric.

I have found that the acids useful on the cleaned glass cloth in the preliminary acid treatment of this invention should have a pH in the range of about 2.8 to 5.0. The acid solution after application to the glass cloth will be raised in pH, and the drain-off solution from the fabric should attain a pH in the range of about 3.2 to 6.5. That is, the pH should be raised in value a minimum of about .4 of a point if a low pH acid is used and a maximum of about 1.5 if an acid of the maximum pH is employed. Acids suitable for the accomplishment of this objective include dilute mineral acids, such as hydrochloric and sulfuric. However, mono-basic organic acids, such as formic and acetic acid, are to be preferred as the mineral acids react very rapidly with the glass and are not readily controlled.

In order to effect optimum control of the acid solution the acid should generally be buffered. Thus when formic acid is employed the acid may be buffered with a solution of sodium formate, and when acetic acid is used sodium acetate may be employed as the buffering agent. I have found, however, that a volatile alkali such as ammonia or organic alkalis such as triethanolamine or morpholine are very effective as buffering agents in conjunction with formic acid. For many purposes these latter alkalis are preferred, as sodium formate being a water soluble salt tends to increase the water absorption property of the ultimate laminate, if not completely removed prior to lamination, a defect which is readily overcome by the use of ammonia, morpholine or triethanolamine.

It has been found that sodium formate may be effectively employed with formic acid by utilizing a water wash to remove the salts, this action preferably taking place in the case of chrome complex treating after the chrome treatment has been applied to the acid treated cloth and set thereon. The washing step at this point of the process is effective not only to remove the salts, but the excess chrome is thereby eliminated. Such use of sodium formate is desirable since it permits a considerable increase in the equivalent concentration of formic acid at a uniform pH level.

The required pH of the buffered acid solutions may be attained by controlling either the acid or buffering agent content. Thus 0.5 to 1.0 gram of triethanolamine in 1000 cc. of water may have added to it sufficient formic acid to bring the pH into the range of 3.9 to 5.0. Alternatively 22 cc. to 42 cc. of 2% formic acid in 1000 cc. of water may have ammonium hydroxide added thereto in sufficient amount to bring the pH in the range of 3.9 to 5.0. Similarly 0.1 to 0.5 grams of morpholine in 1000 cc. of water may be adjusted by the addition of formic acid to the desired pH of 3.9 to 5.0. In the case of sodium formate and formic acid it is generally desirable to employ a considerable excess of the sodium formate, being careful to remove the same by washing after the preliminary acid treatment is completed, and in the case of a chrome complex application after the treatment has been completed. The chrome complex application may be a Werner type compound, a methacrylato chomic chloride, fully described and a bulletin of du Pont de Nemours of Wilmington, Delaware, entitled "Volan" Methacrylato Chromic Chloride Product Information, dated January 19, 1950.

It should also be noted that it is desirable in the practice of the invention that where the chrome complex treatment is employed the methacrylate chromic chloride itself should be buffered or neutralized to a pH of about 4.5 and that the neutralizing agent should be of the same constituents as are used in the preliminary acid as a buffer. Further, I have found that the chrome complex solution, immediately after preparation thereof, should be neutralized at once as a delay in neutralizing tends to have an adverse effect on the ultimate bonding capabilities of the chrome complex.

All types of glass compositions such as E and T glass, which are useful in the production of glass fibers, are suitable for the practice of the invention. Further all oil-starch binder materials utilized in glass cloth are subject to removal from the cloth by the processes more particularly noted hereinafter.

The application of the resin materials to the glass cloth surfaces is in itself well known and the techniques customarily employed in the art may be utilized with the prepared surface of invention.

This invention accordingly contemplates unique process steps including the removal of the binder material from glass cloth and hydrolysis of the glass surface with strong alkali, a preliminary acid treatment to condition the surface of the glass cloth, a treatment with an agent such as chrome complex to render the acid treated surface of the glass particularly suitable for the receipt of resinous materials and the application of the resin. It is to be noted, however, that it is not necessary in all instances to apply the chrome treatment as many resins, such as the curing type silicones, as noted hereinbefore, laminate readily with the acid treated hydrolyzed glass surface.

The invention also contemplates an improved and water resistant glass cloth-resin laminate.

The invention will be more clearly understood by reference to the drawing and the following specific examples.

Referring to the drawing.

EXAMPLE I

Figure 1:
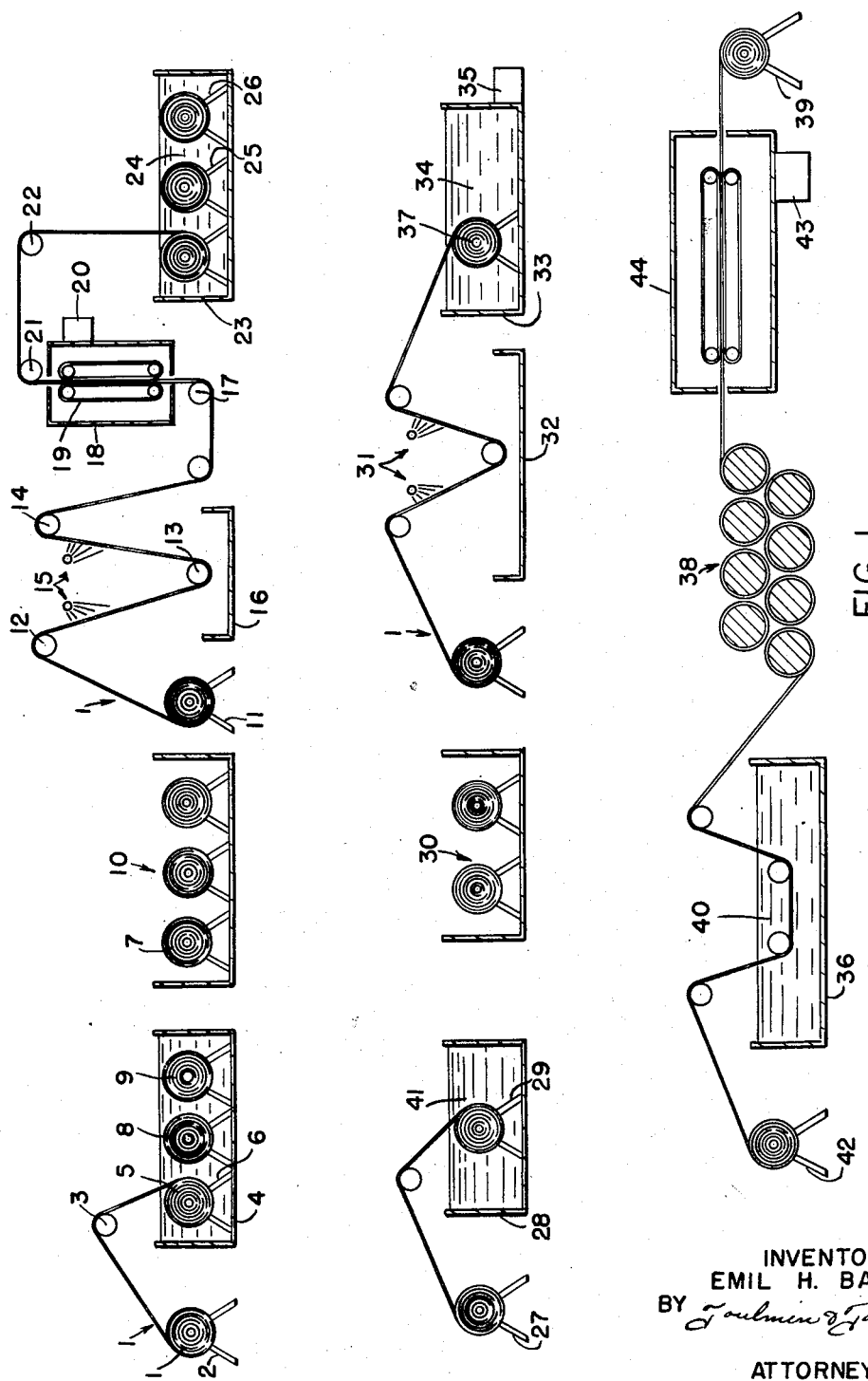
Figure 1 is a diagrammatic representation of the apparatus used in the process of invention.
Figure 2:
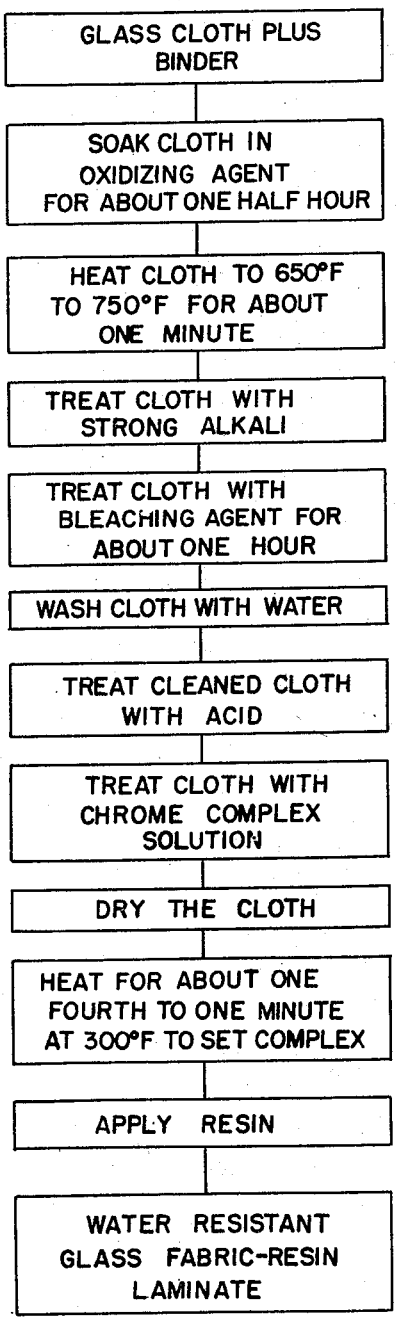
Figure 2 is a flow sheet illustrating the steps of the preferred embodiment of the invention.
Figure 3:
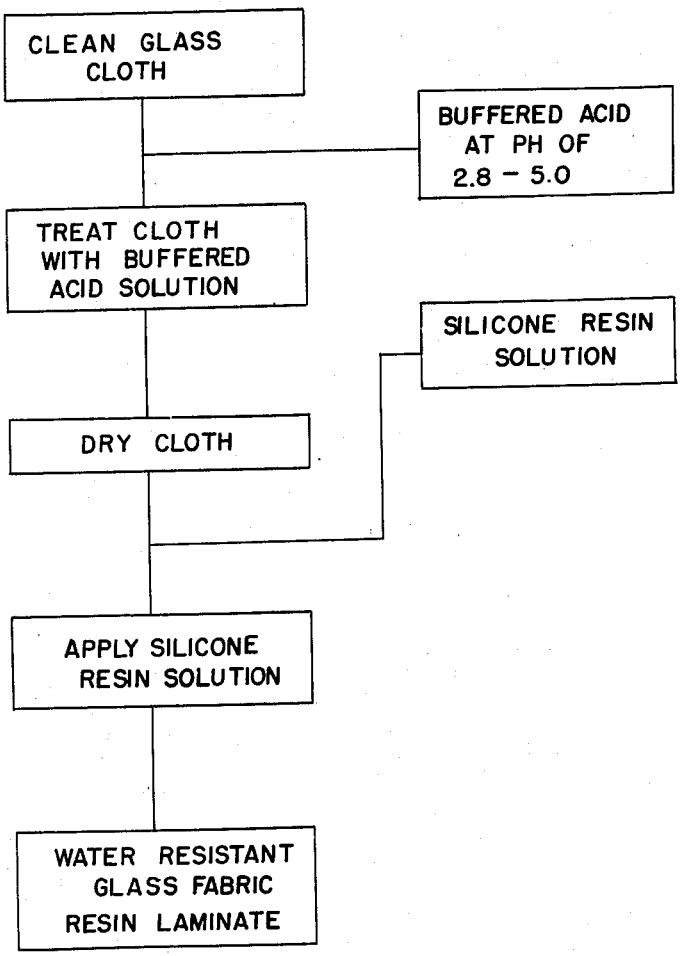
Figure 3 is a flow sheet illustrating the steps of another embodiment of the process of invention.

Referring to Figure 1, there is shown a roll of glass cloth 1 produced from standard "E" glass, the fibers of which during manufacture were treated with an aqueous binder material consisting by weight of about 2% of hydrogenated cottonseed oil (Pureco), about 8% of partially dextrinized starch (Globe Gum), about .06% of gelatin, about .13% of polyvinyl alcohol, about .2% of Tween 81 (partial esters of fatty acids and hexitolanhydrides combined with polyoxyethylene chains), about .4% of onyx cation X (fatty imidazoline derivative), the balance being water and a very small amount of borax to bring the pH of the dispersion into the range of 6.0 to 6.6. This binder material, minus the water content, is present to the extent of about 1.8% by weight on the dry glass cloth roll shown at 1.

The roll of glass cloth 1 is shown mounted upon a stand 2 and may be appropriately unreeled and passed over an idler roller 3, into a tank 4 containing an aqueous solution of potassium chlorate having a chlorate concentration of about 5%, approximately .05 to 0.1 of 1% by weight of the solution of Triton N-100 wetting agent (an aryl alkyl polyether alcohol soluble in all proportions in cold water and soluble in most organic compounds) as detergent, indicated generally at 5. This treatment serves to remove a portion of the starch and soluble borax and gelatin from the cloth and to render the binder remaining susceptible to the temperature treatment described hereinafter. The cloth is rerolled in the solution on stand 6 and permitted to soak for about ½ to 1 hour, whereupon it is removed from the chlorate solution and stored as at 7 to await further processing. It is clear that a number of rolls may be subjected to the action of the chlorate at one time as indicated at 8, 9 and that a small storage space indicated generally at 10 will accommodate a considerable number of treated rolls.

Alternatively to the soaking treatment a dry glass cloth may be simply passed under sprays indicated generally at 15, which sprays are fed with a chloride solution described in conjunction with the soaking treatment. Such a spray treatment is effective to remove a large proportion of the starch from the cloth, but does not affect the oil content thereof. However, the spray treatment has a sufficient action upon the binder of the cloth to permit the binder to be substantially completely removed in a subsequent oven treatment to be described hereinafter.

The sprays 15 may also be used in conjunction with the soaking treatment, as it is preferable to pass a wet cloth to the oven 18. Accordingly fabric which has been subjected to the soaking treatment may be mounted on stand 11 and passed continuously over rolls 12, 13 and 14 and under sprays 15, the sprays being provided with chlorate solution 5 by a pump (not shown) provided to move the liquid from tank 4 to the sprays.

It may be noted that it is preferred to use in the sprays a solution such as that in tank 4 containing some dispersed starch as it has been found that the presence of the starch tends to enhance the spray action.

The cloth upon leaving the spray is passed under a spreader roller 17 and thence to oven 18 which operates at a temperature of approximately 650° F. to 750° F., and wherein a conveyor indicated at 19 driven through power means denoted at 20 supplies motive power to the cloth. The oven has an overall length of about 12 feet and the conveyor may be operated at controlled adjustable speeds of between about 2 to 30 feet per minute, and in the instance under consideration the cloth and conveyor were driven at about 20 to 24 feet per minute, the cloth assuming in the latter part of the oven traverse a temperature of about 600° F. to 650° F. It may be noted that generally it is desirable to induce movement of the cloth by providing motive means on one or more of the rolls over which the cloth passes, as will be understood by one skilled in the art.

From the oven 18 the cloth is passed over idlers 21, 22 into tank 23 containing a hot alkali solution at a temperature of about 170° F. to 180° F. This aqueous solution comprises about 0.1 of 1% caustic soda. Other strong alkalis such as potash, lime or ammonia, may be used however in the same concentration. The glass cloth is soaked in this alkali for approximately one-half to one hour, and as may be noted the tank 23 may hold a number of rolls on stands 25, 26 as indicated.

The cloth upon removal from the alkali is passed preferably while still wet from stand 27 into tank 28 containing a 0.5% aqueous solution of hypochlorite at 75° F. to 80° F. and immersed therein in rolled form as at 29 for about one-half hour. Alternatively the cloth may be simply passed through the hypochlorite and stored as indicated generally at 30 in which case the storage time should also be approximately 30 minutes. It should be noted that, as set forth in my copending application, where the oven speed is low and the binder is completely removed in the oven, that the hypochlorite treatment may be eliminated, the hot alkali treatment being sufficient to accomplish the desired hydrolysis of the glass surface.

The glass cloth 1 after the hypochlorite treatment is passed under water sprays 31, the water preferably having a temperature in the range of 150° F. to 175° F. This spray effectively removes excess hypochlorite from the cloth and the spent wash water of the spray passes to drainage or in some instances a recycling treatment through pan 32.

The now thoroughly cleaned fabric is passed to the preliminary acid treatment in tank 33. Solution 34 contained in tank 33 is made up of approximately 213 grams of sodium formate and about 50 grams of 90% formic acid in 50 gallons of water to give the solution a pH of about 4.3

The acid treatment is itself preferably accomplished by winding the cloth on a perforated mandrel 37 and forcing the acid to the interior of the mandrel through suitable connections (not shown), power being supplied by means of a pump unit indicated generally at 35. The acid liquid is passed through the cloth while the roll is completely submerged in solution 34.

Alternatively the cloth fresh from the cleaning operation may be treated with a spray of the buffered acid or by merely a soaking treatment in tank 33.

In either case the solution dripping from the glass cloth as it is removed from the direct action of the acid should attain a pH in the range of about 5.0 to 6.5. It will be noted that the alkali of the cloth as reacted to raise the pH of the acid.

Where the cloth is to be treated with a chrome complex the fabric is passed, after removal from tank 33 and while wet with the acid treatment, directly into the chrome complex bath contained in tank 36. The chrome complex solution 40 contains a 1% aqueous solution of methacrylate chromic chloride, to which there has been added approximately 2¼% of a 5% solution of sodium formate containing .2% formic acid, all percentages being on a weight basis.

In preparing this solution it is essential for the attainment of optimum results that the chrome complex solution be freshly prepared and that the neutralizing solution of formate and formic acid be added to the freshly prepared chrome complex to adjust the pH of the solution to approximately 4.3 to 4.5. The glass fabric is merely passed through this chrome solution and in given instances sprays may be substituted for the bath.

The cloth while wet with the chrome complex is then passed over a slasher type drum unit 38 and rapidly dried, the slasher being fed with steam from a source and steam lines (not shown). The speed of passage of the cloth over the slasher is preferably at a rate of about 12 to 14 feet per minute. While the speed may be suitably reduced, it should always be sufficiently high in view of the temperature conditions of the slasher to inhibit bleeding of the chrome complex to the surface exposed to evaporation, a factor which leads to uneven distribution of the chrome throughout the thickness of the cloth. Thus the slasher should be operated in such fashion that is, at a temperature and speed such that bleeding will not take place nor deterioration of the chrome complex set in. In the present instance a time period on the drying unit of ¼ to 1 minute at 300° F. (cloth temperature) was found to be satisfactory. The minimum temperature which has been found satisfactory for production operation is about 225° F. on thin fabrics.

Upon leaving the slasher the cloth is heated in oven 44 which operates at about 300° F and after passing therethrough is rolled upon stand 39. The time of passage for the cloth through this oven is about ¼ to 1 minute, and under these conditions the chrome complex becomes thoroughly set. The surface thus prepared has been found to be particularly receptive to resin materials such as the polyesters and particularly methyl methacrylate resins.

Where an excess of sodium formate is utilized it is, as noted hereinbefore, preferable to wash this material from the cloth by a water wash after the dried material at 39 has cooled. This washing removes the excess water absorptive salt and improves the water-resisting properties of the laminate.

EXAMPLE II

In the preparation of the glass for a silicone resin treatment the procedure is the same as set forth in Example I except that the treatment in solution 40 of tank 36 is eliminated and the acid bath in tank 33 preferably contains only a formic acid solution at a pH of between about 2.8 to 3.8. That is the formic acid is present in an amount of about .1 to .2% on the weight of the solution.

Under these conditions then the cloth may be treated with a formic acid solution of a pH of 2.8 in tank 33 and when the cloth passes out of this solution the liquid dripping therefrom will have attained a pH of about 3.2 to 3.5, indicating a completed acid treatment. Thereafter the cloth is passed directly to the dryer 38, whereafter it may be laminated with a silicone resin such as an organosilicone polymer material in solution. The water resistance of this laminate is materially improved over that made under similar conditions but without the preliminary acid treatment.

Alternatively, in the above process the cloth upon leaving the formic acid solution in tank 33 may be passed to a solution of a silane compound or may be first dried and then treated with the silane in a tank as 40 the silane being contained in a volatile solvent. The silane may be a methoxy, ethoxy or vinyl chlor compound contained in xylene solvent. Compounds of a structural formula having vinyl groups and a chlorine bonded to the silicone atom, or having three alkyls and an ethoxy group joined to the silicon as well as di-chlors, di-ethoxys and mixtures thereof in volatile solvents such as the aromatics are particularly suitable.

It is to be noted that the invention is not to be restricted to a particular silane treatment or a paritcular silicone since the surface of invention is receptive to substantially all known compounds of the kind indicated and others are constantly being developed.

The silane treated cloth is then dried and the silicone resin laminated with the cloth in the manner known to the art.

EXAMPLE III

The glass cloth in this instance was treated as in Example I except that the acid solution indicated at 34 and the chrome solution indicated at 40 were prepared as follows:

Acid solution

About 0.5 gram of triethanolamine in 1000 cc. of water and formic acid in sufficient amount to make the pH approximately 4.1.

Chrome solution

This solution contains 15 grams of methacrylate chromic chloride, 1000 cc. of water, and about 2½% of a neutralizing solution. This neutralizing solution contains 3% by weight of triethanolamine and sufficient formic acid to give the neutralizer a pH in the range of about 7. This chrome solution is then regulated to a pH of about 4.5, the acid buffer solution being utilized to effect this pH.

The acid treated cleaned glass cloth was then coated on each side thereof with a copolymer of styrene and an unsaturated glycol ester resin and the laminate cured. The water absorption of this laminate was approximately one-half of that normally attained using similar components, that is glass fabric, chrome complex and resin forming a laminate.

The figures actually obtained were .15 absorption for the laminate of invention and .35 for the known laminate comprising a polyester and glass fabric only.

This test was the standard water absorption test of the industry.

EXAMPLE IV

The treatment of the glass cloth was exactly that as set forth in Example I except that the acid solution 34 and the chrome solution 40 were prepared as follows:

Acid solution

About 25 cc. of 2% formic acid in 1000 cc. of water and sufficient ammonium hydroxide to give the solution a pH of approximately 4.2.

Chrome solution

The chrome solution contains approximately 15 grams of methacrylate chromic chloride, 1000 cc. of water, and about 1½% of a neutralizing solution. This said neutralizing solution contains about 3% by weight of ammonium hydroxide and sufficient formic acid to give the neutralizer a pH of about 7. The final chrome solution is regulated to a pH of preferably 4.5, the acid buffer solution being utilized to effect this purpose as necessary.

The fabric prepared in the above indicated manner was laminated with a polyester such as a polymerized combination of monomeric styrene and a glyceride, and the water absorption properties are similar to those attained in the other examples set forth hereinbefore.

EXAMPLE V

A cleaned glass cloth, which during the course of its preparation had been subjected to the action of strong alkali as described in Example I, was treated with a solution of formic acid only having a pH of about 3.5. The time of treatment was about 30 minutes and the quantity of cloth employed in relation to the amount of acid was such that a buffer was not necessary to maintain the pH in the proper range.

It was found that cloth thus treated bonded directly to the curing type of silicone resin after being dried at a temperature somewhat less than 200° F.

It was also found that this glass bonded directly to the silane ethers and tetraethyl silicate, giving a laminate of improved water resistance and high electrical resistance properties.

The term clean glass cloth or fabric as used in this application is understood to mean a fabric which is free of all matter foreign to the glass compound, such as binder material, and to include fabrics which have been treated with alkali during the course of removal of the binder.

The term drain-off is to be understood to simply mean the acid solution which drips from the cloth as the cloth is removed from a soaking tank or spray, the pH of this drain-off acting as a measure of the effectiveness of the acid or the cloth.

EXAMPLE VI

The glass cloth in this instance was treated as in Example I except that the acid solution indicated at 34 and the chrome solution indicated at 40 were prepared as follows:

Acid solution

About 0.2 gram of morpholine in 1000 cc. of water and formic acid in sufficient amount to make the pH approximately 4.0.

Chrome solution

The chrome solution contains approximately 15 grams of methacrylate chromic chloride (Volan), 1000 cc. of water, and about 26 cc. of a 1% solution of morpholine. The chrome solution in this instance also preferably has a pH of about 4.5, and should be in the range of about 4.2 to 4.7, adjustment of this solution being made as necessary to attain this result.

The cloth treated in accordance with Example VI when bonded to a polyester showed marked resistance to water absorption.

It will be noted that there has been set forth a process for the preparation of glass cloth for use in the production of glass cloth resin laminates. The method set forth provides a short moderate cycle of operation which is substantially a continuous operation since a number of rolls may be passing through various stages of treatment at the same time.

It is to be understood that while there have been given herein certain specific examples of the practice of the invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

I claim:

1. In a method of preparing laminates comprising pretreating and laminating a plurality of glass fabrics together by resinous material, the improvement in which said pre-treating of clean glass fabrics prior to said laminating step, comprises treating the glass fabric with a solution consisting essentially of an acid having a pH in the range of about 2.8 to 5.0.

2. In a method of preparing laminates comprising pretreating and laminating a plurality of glass fabrics together by resinous material, the improvements in which said pre-treating of the glass fabrics prior to said laminating step, comprises the steps of cleaning the glass fabric to substantially free it of binder, thereafter soaking the fabric with a dilute alkaline solution, then washing the glass fabrics substantially free of alkali, and thereafter impregnating the fabric with a solution consisting essentially of an organic acid and having a pH in the range of 2.8 to 5.0.

3. In a method of preparing laminates comprising pretreating and laminating a plurality of glass fabrics together by resinous material, the improvement in which said pre-treating of clean glass fabrics prior to said laminting step, comprises soaking the glass fabric with a dilute alkaline solution, then washing the glass fabric substantially free of alkali, and thereafter impregnating the fabric with a solution consisting of a buffered organic acid selected from the group of formic and acetic and having a pH in the range of 2.8 to 5.0.

4. In a method of preparing laminates comprising pretreating and laminating a plurality of glass fabrics together by resinous material, the improvement in which said pre-treating of clean glass fabrics prior to said laminating step, comprises impregnating the glass fabric with a solution consisting essentially of an acid having a pH in the range of about 2.8 to 5.0, and then while the fabric is wet with acid passing the fabric through a bath of a solution of methacrylate chromic chloride, and thereafter drying the fabric rapidly at a temperature above about 225° F.

5. In a method of preparing laminates comprising pretreating and laminating a plurality of glass fabrics together by resinous material, the improvement in which said pre-treating of the glass fabrics prior to said laminating step comprises the steps of cleaning a glass fabric to substantially free it of binder, thereafter soaking the glass fabric with a dilute alkali solution, washing the glass fabric substantially free of alkali, impregnating the fabric with formic acid having a pH in the range of about 2.8 to 5.0, and thereafter drying the cloth at a temperature of less than 200° F.

6. In a method of preparing laminates comprising pretreating and laminating a plurality of glass fabrics with silicone resins which laminates have increased resistance to water absorption, the improvements in which said pretreating of clean glass fabrics prior to said laminating step comprises the steps of soaking the glass fabric with a dilute alkaline solution, washing the fabric substantially free of alkali, impregnating the fabric with a solution consisting essentially of formic acid having a pH in the range of 2.8 to 5.0, while the fabric is wet with acid passing the fabric in contact with a silane solution, and drying the resultant silane treated fabric at a temperature below 200° F.

References Cited in the file of this patent

UNITED STATES PATENTS

| | | |
|---|---|---|
| 2,184,320 | Simpson | Dec. 26, 1939 |
| 2,383,469 | Colbert et al. | Aug. 28, 1945 |
| 2,407,483 | Ebaugh | Sept. 16, 1946 |
| 2,433,292 | Perloff | Dec. 23, 1947 |
| 2,552,910 | Steinman | May 15, 1951 |
| 2,563,288 | Steinman | Aug. 7, 1951 |

OTHER REFERENCES

John Wiley & Sons, Deming-General Chemistry 1935, 4th edition (only pages 530–533 relied upon).